US012011847B2

(12) United States Patent
Choi

(10) Patent No.: US 12,011,847 B2
(45) Date of Patent: Jun. 18, 2024

(54) WOOD PREFORMING DEVICE FOR MANUFACTURING CRASH PAD FOR VEHICLE INCLUDING REAL WOOD SHEET

(71) Applicant: HYUNDAI MOBIS Co., Ltd., Seoul (KR)

(72) Inventor: Ik Keun Choi, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 17/840,719

(22) Filed: Jun. 15, 2022

(65) Prior Publication Data

US 2023/0044042 A1 Feb. 9, 2023

(30) Foreign Application Priority Data

Aug. 4, 2021 (KR) ........................ 10-2021-0102383

(51) Int. Cl.
*B27N 3/08* (2006.01)
*B27N 3/20* (2006.01)

(52) U.S. Cl.
CPC ............. *B27N 3/086* (2013.01); *B27N 3/203* (2013.01)

(58) Field of Classification Search
CPC ............. B27N 3/086; B27M 1/02; B27D 3/00
See application file for complete search history.

(56) References Cited

U.S. PATENT DOCUMENTS 1,906,392 A * 5/1933 McLeod .................. B27H 1/00 156/443
2,155,375 A * 4/1939 Jablonsky ................ B27M 3/10 244/101
2,346,040 A * 4/1944 Montague ................ B27M 3/24 144/380
3,132,981 A * 5/1964 Stack .................... E06B 3/7001 52/745.15
3,686,383 A * 8/1972 Makinen ................ B27N 3/086 264/123
4,017,980 A * 4/1977 Kleinguenther ..... B27M 3/0053 422/26
4,517,147 A * 5/1985 Taylor .................... B27N 3/086 264/102
5,096,409 A * 3/1992 Stofko .................. B30B 15/064 100/297

(Continued)

FOREIGN PATENT DOCUMENTS

KR 10-2020-0042116 A 2/2021

*Primary Examiner* — Andrew D Graham
(74) *Attorney, Agent, or Firm* — NSIP Law

(57) ABSTRACT

A wood preforming device that manufactures a crash pad for a vehicle including a real wood sheet is provided. The wood preforming device includes a lower press mold including a debossed portion disposed on a portion of the lower press mold on which a product is to be formed, and a support portion supporting an upper press mold when the lower press mold and the upper press mold are compressed. The support portion has a fixing protrusion fixing the real wood sheet, the upper press mold has an embossed portion corresponding to the debossed portion of the lower press mold. A movable core provided on the debossed portion of the lower press mold guiding the real wood sheet by moving upward from the debossed portion when the upper press mold moves downward, and a steam module spray steam with a preset capacity to an edge portion of the debossed portion.

16 Claims, 12 Drawing Sheets

(56) References Cited

U.S. PATENT DOCUMENTS

| | | | | | |
|---|---|---|---|---|---|
| 5,678,618 | A * | 10/1997 | Lindhe | B27M 1/02 | 144/380 |
| 6,132,656 | A * | 10/2000 | Dodd | B27N 3/086 | 264/109 |
| 6,187,234 | B1 * | 2/2001 | Bonomo | B27N 3/086 | 264/102 |
| 2004/0231265 | A1 * | 11/2004 | Walsh | B27M 3/0093 | 52/745.19 |
| 2005/0150573 | A1 * | 7/2005 | Hirai | B27M 1/02 | 144/256.1 |
| 2005/0229533 | A1 * | 10/2005 | Suzuki | B27M 1/08 | 52/800.1 |
| 2010/0098895 | A1 * | 4/2010 | Baillargeon | E04C 2/40 | 144/381 |
| 2010/0101685 | A1 * | 4/2010 | Kitajima | B65D 1/34 | 144/380 |
| 2012/0021176 | A1 * | 1/2012 | Ito | B27M 1/02 | 428/141 |
| 2013/0043617 | A1 * | 2/2013 | Nakano | B29C 71/02 | 264/234 |
| 2013/0243983 | A1 * | 9/2013 | Omote | B32B 21/042 | 156/224 |
| 2017/0165864 | A1 * | 6/2017 | Oh | B32B 5/022 | |
| 2023/0044292 | A1 * | 2/2023 | Choi | B27D 1/083 | |

* cited by examiner

WOOD PREFORMING DEVICE FOR MANUFACTURING CRASH PAD FOR VEHICLE INCLUDING REAL WOOD SHEET

CROSS-REFERENCE TO RELATED APPLICATIONS

This application claims the benefit under 35 USC § 119(a) of Korean Patent Application No. 10-2021-0102383, filed on Aug. 4, 2021, in the Korean Intellectual Property Office, the entire disclosure of which is incorporated herein by reference for all purposes.

BACKGROUND

1. Field

The following description relates to real wood skin used for automatic wrapping, and a process and apparatus for manufacturing the same.

2. Description of Related Art

Real wood skin applied to a vehicle in the related art is made by preforming a real wood sheet on deco-veneer wood and then performing insert-injection molding (back injection).

Thereafter, trimming is performed on an end of the injection-molded real wood sheet, and then curling and coating are sequentially performed on the real wood sheet, thereby manufacturing the real wood skin.

The typical real wood skin product, which is made by applying the back insert-injection molding process, may provide real wood having a visually and tactilely excellent surface. However, because the real wood having high hardness is attached to the injection-molded part, the real wood provides cheeping feeling to a customer when the customer pushes the real wood.

Of course, some customers may think that it is natural for the real wood to have high hardness. However, a customer, who needs soft interior materials, cannot be satisfied with the real wood.

SUMMARY

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter.

In a general aspect, a wood preforming device includes a lower press mold, comprising a debossed portion disposed on a portion of the lower press mold on which a product is to be formed, and a support portion configured to support an upper press mold when the lower press mold and the upper press mold press each other, the support portion configured to have a fixing protrusion to fix a real wood sheet; a movable core disposed on the debossed portion of the lower press mold and configured to guide the real wood sheet by moving in an upward direction from the debossed portion when the upper press mold moves in a downward direction; and a steam module configured to spray steam with a preset capacity to an edge portion of the debossed portion, wherein the upper press mold is configured to have an embossed portion that corresponds to the debossed portion of the lower press mold.

The steam module may be configured to operate when the embossed portion of the upper press mold and the debossed portion of the lower press mold press each other.

The steam module may be configured to implement at least one of a moisture and an aqueous stain.

The steam module may be configured to spray the steam to the real wood sheet mold for a preset heating time when the real wood sheet is seated on the lower press before the embossed portion of the upper press mold and the debossed portion of the lower press mold press each other.

In a general aspect, a wood preforming method includes fixing a real wood sheet to a fixing pin of a lower press mold; moving an upper press mold in a downward direction toward the lower press mold; spraying, by a steam module disposed at an edge of the lower press mold, steam with a preset capacity to a debossed portion of the lower press mold before a compression of the real wood sheet; forming a seating hole in the real wood sheet by moving a hole machining pin disposed on the lower press mold in an upward direction; and detaching a preformed real wood sheet by moving the upper press mold in an upward direction.

In the moving of the upper press mold in the downward direction toward the lower press mold, a movable core disposed on the debossed portion of the lower press mold may be configured to guide the real wood sheet while the movable core moves in the upward direction from the debossed portion, and then moves in the downward direction together with the upper press mold when the upper press mold moves in the downward direction.

In the spraying of the steam, moisture to be sprayed by the steam module may be heated to a temperature that is equal to or greater than a threshold temperature.

In the spraying of the steam, one of a moisture and an aqueous paint may be implemented as moisture sprayed by the steam module.

Other features and aspects will be apparent from the following detailed description, the drawings, and the claims.

BRIEF DESCRIPTION OF DRAWINGS

Throughout the drawings and the detailed description, the same reference numerals may refer to the same, or like, elements. The drawings may not be to scale, and the relative size, proportions, and depiction of elements in the drawings may be exaggerated for clarity, illustration, and convenience.

DETAILED DESCRIPTION

Figure 1:
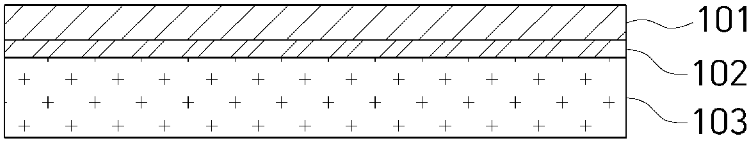
FIG. 1 is a reference view illustrating real wood skin which may be used for automatic wrapping, in accordance with one or more embodiments.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known, after an understanding of the disclosure of this application, may be omitted for increased clarity and conciseness, noting that omissions of features and their descriptions are also not intended to be admissions of their general knowledge.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for the purpose of describing particular examples only, and is not to be used to limit the disclosure. As used herein, the singular forms "a," "an," and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof. The use of the term "may" herein with respect to an example or embodiment (for example, as to what an example or embodiment may include or implement) means that at least one example or embodiment exists where such a feature is included or implemented, while all examples are not limited thereto.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Likewise, expressions, for example, "between" and "immediately between" and "adjacent to" and "immediately adjacent to" may also be construed as described in the foregoing.

Unless otherwise defined, all terms, including technical and scientific terms, used herein have the same meaning as commonly understood by one of ordinary skill in the art to which this disclosure pertains consistent with and after an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

The one or more examples may provide a real wood sheet that visually provides a real wood feeling, a crash pad for a vehicle that provides flexibility by implementing the real wood sheet, and a press device that manufactures a crash pad for a vehicle.

The one or more examples provide a real wood sheet that is implemented for wrapping during a process of manufacturing a crash pad for a vehicle, and a press device that manufactures crash pad for a vehicle implementing the real wood sheet.

FIG. 1 is a reference view illustrating real wood skin which may be implemented for automatic wrapping, in accordance with one or more embodiments.

As illustrated in FIG. 1, real wood skin according to a first embodiment, which may be used for automatic wrapping, includes a wood layer 101, a mesh layer 102, and a flexible layer 103.

The wood layer 101 is a layer that may provide the same visual feeling or appearance of a wooden material. The wood layer 101 may have a thickness of 0.1 t to 0.2 t and may have a grain of wood made by a shading machine.

Further, the mesh layer 102 is a layer stacked on a lower portion of the wood layer 101 and configured to reinforce a sheet. The mesh layer 102 may have a thickness of 0.2 t.

In addition, the flexible layer 103 is a layer stacked on a lower portion of the mesh layer 102 and configured to provide flexibility. The flexible layer 103 may be made of one of polypropylene (PP) foam and thermoplastic polyolefin (TPO) foam. Further, the flexible layer 103 may have a thickness of 1 t to 2 t.

In addition, according to the first embodiment of the present disclosure, the real wood skin may further include a protective film 104 stacked on an upper portion of the wood layer 101 and configured to protect the wood layer. The protective film 104 may have a thickness of 0.1 t.

Figure 2A:
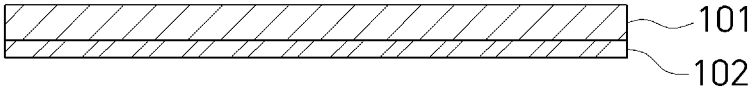
FIG. 2A illustrates an example process of manufacturing a crash pad for a vehicle including a real wood sheet, in accordance with one or more embodiments.
Figure 2B:
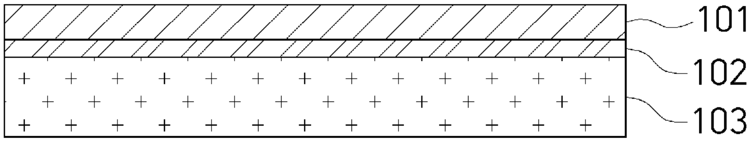
FIG. 2B illustrates an example process of manufacturing a crash pad for a vehicle including a real wood sheet, in accordance with one or more embodiments.
Figure 2C:
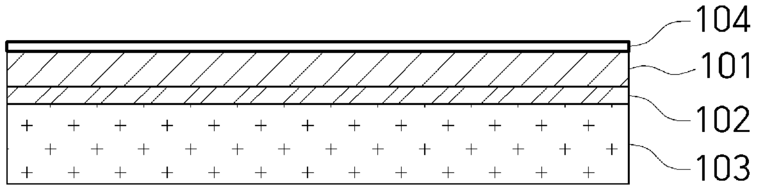
FIG. 2C illustrates an example process of manufacturing a crash pad for a vehicle including a real wood sheet, in accordance with one or more embodiments.

FIGS. 2A to 2C are reference views illustrating a process of manufacturing a real wood sheet, in accordance with one or more embodiments.

As illustrated in FIG. 2A, in the real wood sheet, in accordance with one or more embodiments, the mesh layer 102 is stacked on a lower end of the wood layer 101. Thereafter, as illustrated in FIG. 2B, the flexible layer 103 is stacked on a lower end of the mesh layer 102. Further, as illustrated in FIG. 2C, the protective film 104 may be stacked on an upper end of the wood layer 101 to protect the wood layer 101.

Figure 3:
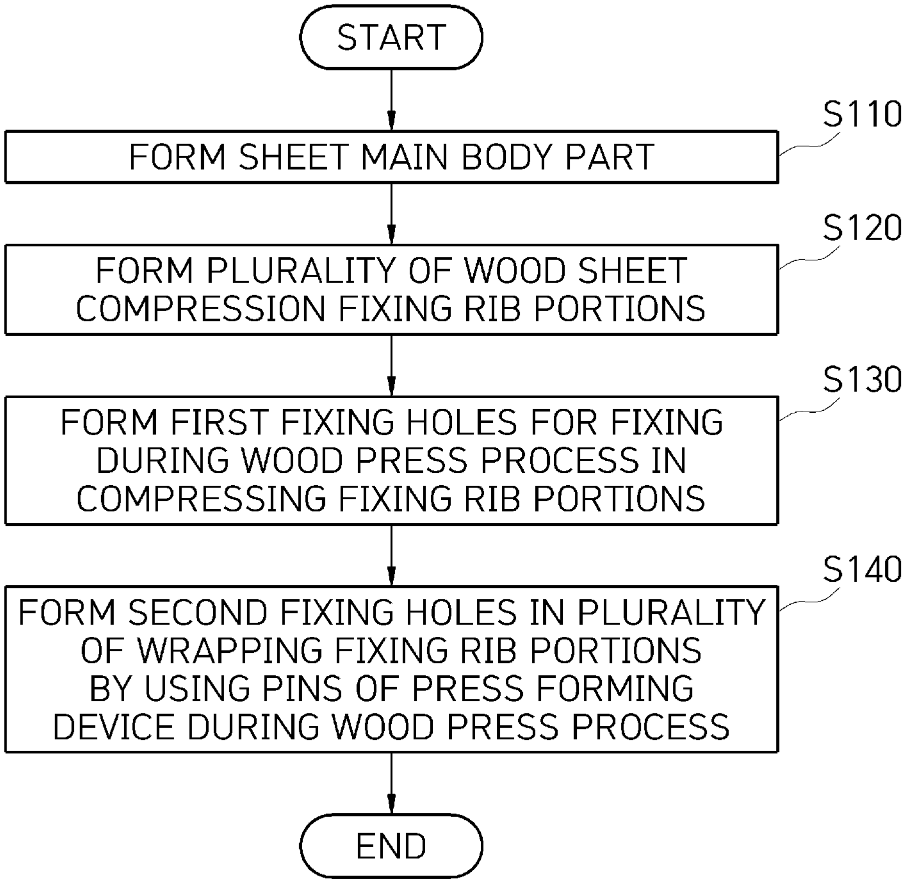
FIG. 3 is a flowchart illustrating an example method of manufacturing a real wood sheet by implementing a wood preforming device that manufactures a crash pad for a vehicle including a real wood sheet, in accordance with one or more embodiments.

A method of manufacturing a real wood sheet to wrap a crash pad, in accordance with one or more embodiments, will be described with reference to FIG. 3.

Figure 4:
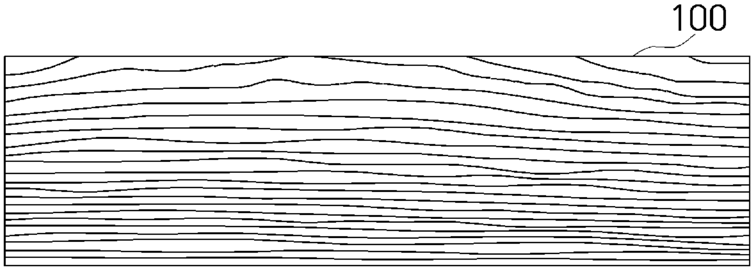
FIG. 4 illustrates a raw real wood sheet, in accordance with one or more embodiments.
Figure 5:
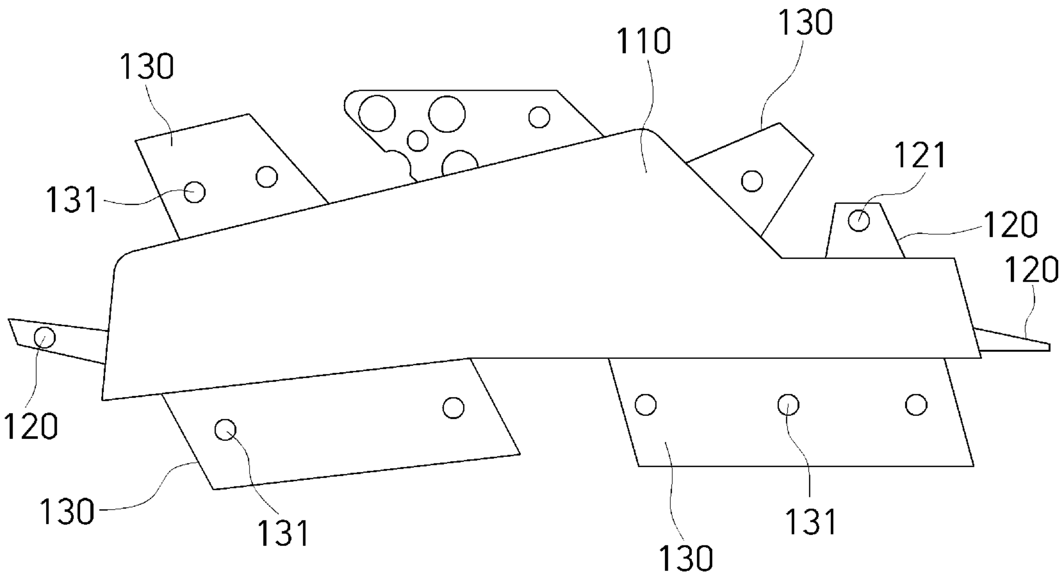
FIG. 5 illustrates a real wood sheet for wrapping produced by implementing the raw real wood sheet, in accordance with one or more embodiments.
Figure 6:
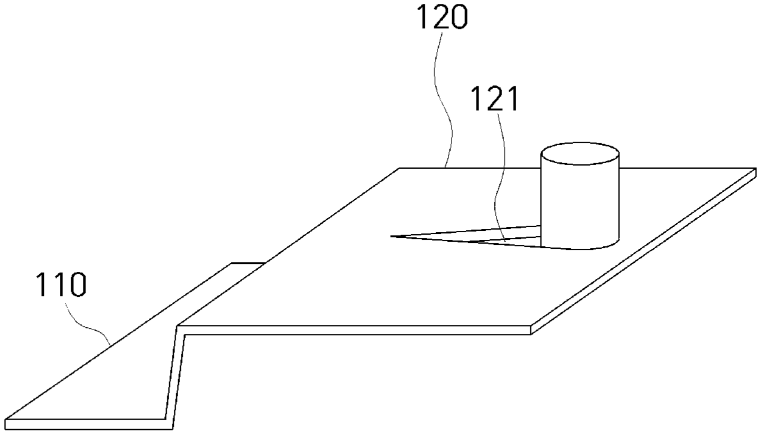
FIG. 6 illustrates an operational example of a first fixing hole during a preforming process, in accordance with one or more embodiments.

To this end, a real wood sheet 100 manufactured by the above-mentioned method of manufacturing a real wood sheet may be formed to have the same shape as a real wood product, as illustrated in FIG. 4. Then, a real wood sheet main body part 110 is manufactured (operation S110), as illustrated in FIG. 5. In this example, the real wood sheet main body part 110 may have the same shape as a part of a dashboard mounted in a vehicle. The real wood sheet main body part 110 may have the same shape as a core for supporting the real wood sheet.

Thereafter, a plurality of wood sheet compression fixing rib portions 120 and a plurality of wrapping fixing rib portions 130 are formed at an outer periphery of the real wood sheet main body part 110 in order to fixing the real wood sheet 100 to a preforming press or compression press during the process (operation S120). The plurality of wood sheet compression fixing rib portions 120 may be formed on the raw real wood sheet by using a forming device (cutter).

First fixing holes 121 are formed in the compressing fixing rib portions 120 so as to be fixed to fixing pins of the preforming press during the preforming process (operation S130).

The first fixing holes 121, which are formed as described above, are fixed to the fixing pins of the press during the preforming process. Meanwhile, as illustrated in FIG. 7, the first fixing hole 121 may further have a slit groove 122.

Figure 8:
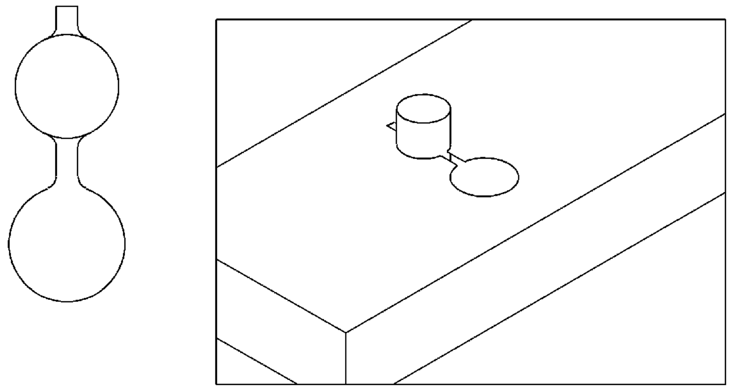
FIG. 8 illustrates a slit groove formed in the first fixing hole, in accordance with one or more embodiments.

Therefore, when the upper press mold and the lower press mold press each other for preforming, the fixing pin of the preforming press may move along the slit groove 122 in the first fixing hole 121, as illustrated in FIG. 8, thereby preventing damage to the real wood sheet main body part 110.

Figure 7:
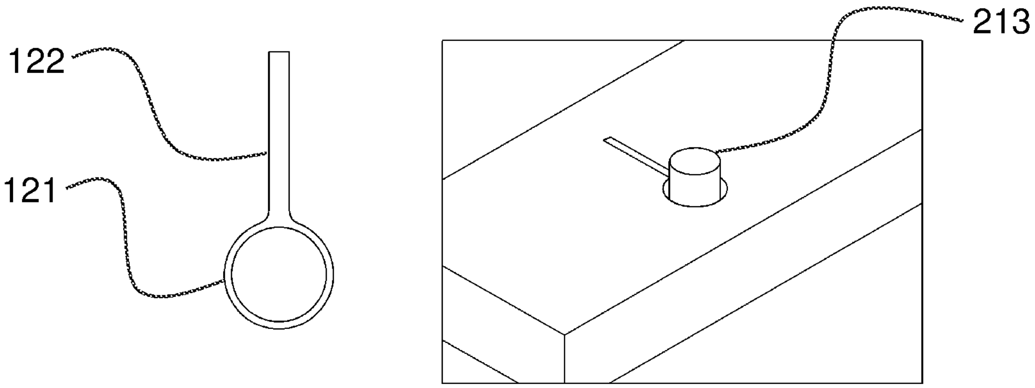
FIG. 7 illustrates a slit groove formed in the first fixing hole, in accordance with one or more embodiments.

That is, when the preforming process is performed on the real wood sheet 100 in the state in which the first fixing holes 121 of the real wood sheet 100 are fixed to the fixing pins of the preforming press, the first fixing holes 121 may be expanded, as illustrated in FIG. 7. Therefore, during the preforming, it is possible to complete the preforming process on the real wood sheet while preventing damage that may occur when the real wood sheet main body part 110 is fixed.

Thereafter, during the wood press process, a hole machining pin of a preforming press is used to form second fixing holes 131 in the plurality of wrapping fixing rib portions 130 during a preforming fixing process in order to fix the real wood sheet to pins of a press forming device (S140).

Meanwhile, positions at which the first fixing holes 121 are formed in the compressing fixing rib portion 120 may be defined depending on an elongation percentage of the real wood.

Figure 9:
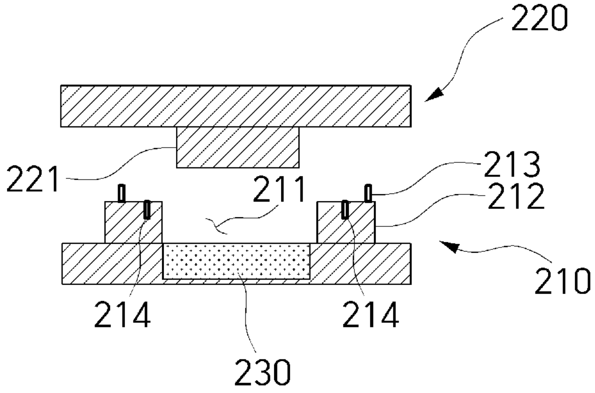
FIG. 9 is a process flowchart illustrating a wood preforming device that manufactures a crash pad for a vehicle including a real wood sheet, in accordance with one or more embodiments.

FIG. 9 is a view illustrating a wood preforming device that manufactures a crash pad for a vehicle including a real wood sheet, in accordance with one or more embodiments.

As illustrated in FIG. 9, the wood preforming device that manufactures a crash pad for a vehicle including a real wood sheet, in accordance with one or more embodiments, includes a lower press mold 210, an upper press mold 220, and a movable core 230.

The lower press mold 210 includes: a debossed portion 211 formed in a portion on which a real wood sheet product is mounted and formed; and a support portion 212 configured to support the upper press mold 220 when the upper press mold and the lower press mold press each other. The lower press mold 210 includes fixing pins 213 configured to fix the real wood sheet 100 to the support portion 212.

The upper press mold 220 includes an embossed portion 221 corresponding to the debossed portion 211 of the lower press mold 210.

The movable core 230 is provided on the debossed portion 211 of the lower press mold 210. The movable core 230 guides the real wood sheet 100 while moving upward from the debossed portion 211 and then moving downward when the upper press mold 220 moves downward.

Meanwhile, the fixing pins 213 may be provided at positions set depending on an elongation percentage of the sheet calculated in respect to an edge portion of the real wood sheet 100 when the real wood sheet 100 is compressed.

Further, the lower press mold 210 may further include hole machining pins 214 configured to form the fixing holes in the wrapping fixing rib portions 130 of the real wood sheet 100 by protruding when the embossed portion 221 of the upper press mold 220 and the debossed portion 211 of the lower press mold 210 press each other.

The hole machining pins 214 may also form the second fixing holes 131 in the wrapping fixing rib portions 130 of the real wood sheet 100 by protruding when the fixing pins 213 provided on the lower press mold 210 are pressed by the upper press mold 220.

Figure 10A:
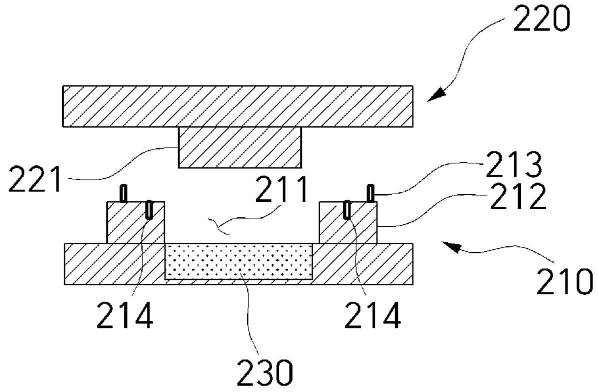
FIG. 10A illustrates a process of operating a lower press mold and an upper press mold, in accordance with one or more embodiments.

As illustrated in FIG. 10A, the fourth embodiment includes the lower press mold 210 and the upper press mold 220.

Figure 10B:
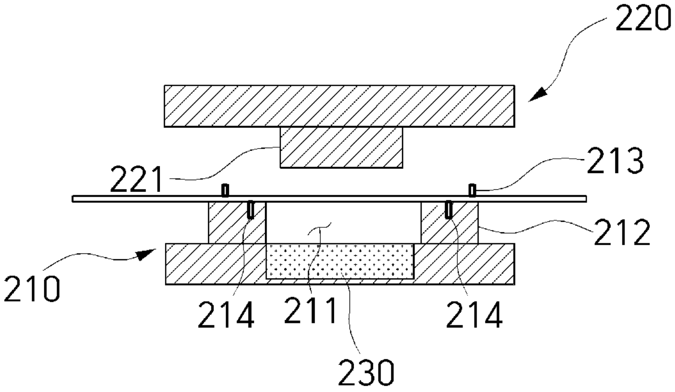
FIG. 10B illustrates an example a process of operating a lower press mold and an upper press mold, in accordance with one or more embodiments.
Figure 10C:
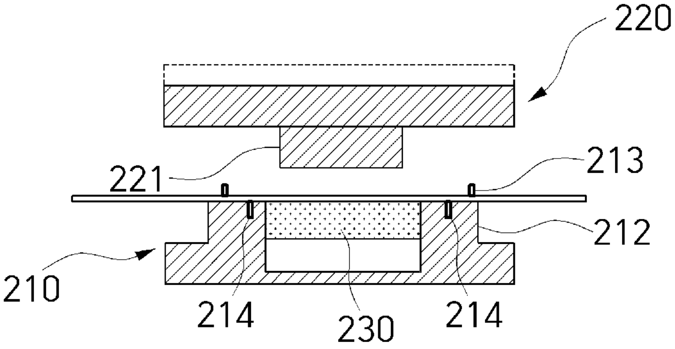
FIG. 10C illustrates an example a process of operating a lower press mold and an upper press mold, in accordance with one or more embodiments.

Thereafter, as illustrated in FIG. 10B, the real wood sheet 100 is seated on the first fixing holes 213 of the lower press mold 210.

In this state, the upper press mold 100 moves downward. In this case, as illustrated in FIG. 100, the movable core 230 provided on the lower press mold 210 guides the real wood sheet 100 while moving upward when the upper press mold 100 moves downward.

Figure 10D:
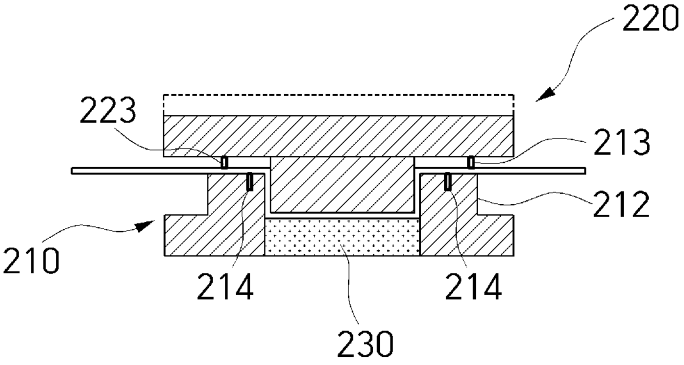
FIG. 10D illustrates an example a process of operating a lower press mold and an upper press mold, in accordance with one or more embodiments.

Thereafter, as illustrated in FIG. 10D, the preforming process on the real wood sheet 100 is completed as the upper press mold 220 is pressed against the lower press mold 210.

Meanwhile, as illustrated in FIG. 10D, the second fixing holes 131 are formed in the wrapping fixing rib portions 130 of the real wood sheet 100 by the hole machining pins 214 provided on the lower press mold 210 during the process in which the lower press mold 210 and the upper press mold 220 press each other.

As described above, according to the fourth embodiment, the fixing holes desired for the step of forming the real wood sheet may be automatically formed during the preforming process. Therefore, it is possible to reduce the total number of additional processes while preventing the positions of the fixing holes from being changed by the preforming process.

That is, it is possible to solve the problem in that the positions of the fixing holes are changed as the real wood sheet is compressed by the press device in the preforming process step when the fixing holes required for the compression process are formed during an initial preforming process.

FIGS. 11A to 11D are reference views illustrating the lower press mold including a steam module according to the fourth embodiment.

Figure 11A:
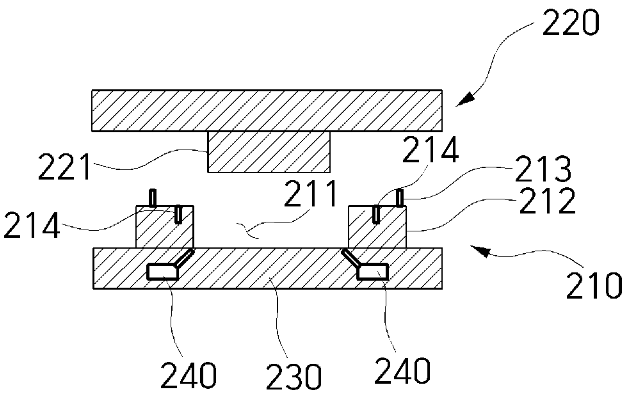
FIG. 11A illustrates the lower press mold including a steam module, in accordance with one or more embodiments.
Figure 11B:
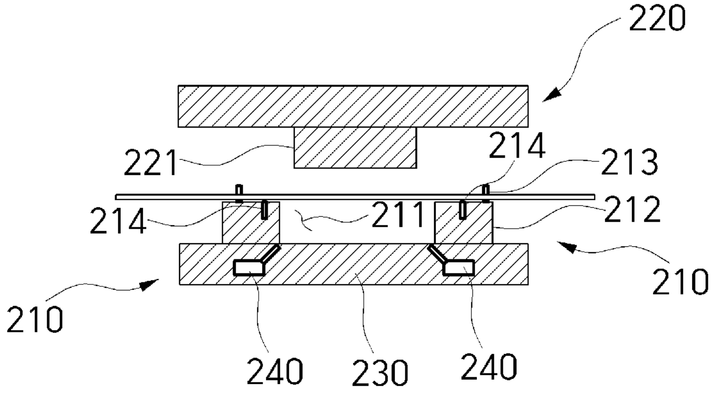
FIG. 11B illustrates the lower press mold including a steam module, in accordance with one or more embodiments.

As illustrated in FIG. 11A, a wood preforming device to manufacture a crash pad for a vehicle including a real wood sheet according to a third embodiment includes a lower press mold 210, an upper press mold 220, and a steam module 240.

The lower press mold 210 includes: a debossed portion 211 formed in a portion on which a real wood sheet product is mounted and formed; and a support portion 212 configured to support the upper press mold 220 when the upper press mold and the lower press mold press each other. The lower press mold 210 includes fixing pins 213 configured to fix the real wood sheet 100 to the support portion 212.

The upper press mold 220 includes an embossed portion 221 corresponding to the debossed portion 211 of the lower press mold 210.

The movable core 230 is provided on the debossed portion 211 of the lower press mold 210. The movable core 230 may guide the real wood sheet 100 while moving upward from the debossed portion 211 and then moving downward when the upper press mold 220 moves downward.

Figure 13:
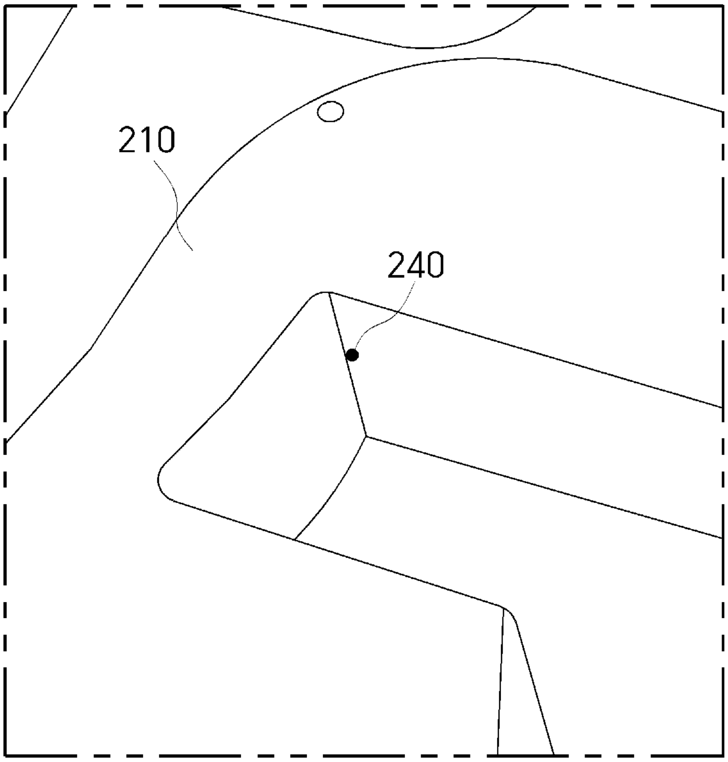
FIG. 13 illustrates an installation position of the steam module, in accordance with one or more embodiments.

The steam module 240 sprays steam with a preset capacity to an edge portion of the debossed portion of the lower press mold 210. As illustrated in FIGS. 11A to 11D and 12, the steam modules 240 may have steam supply nozzles for the respective edges of the debossed portion 211 of the lower press mold 210. Further, as illustrated in FIG. 13, the nozzle may be provided at the edge of the product. A plurality of nozzles may be provided depending on a depth of the debossed portion for forming.

Figure 11C:
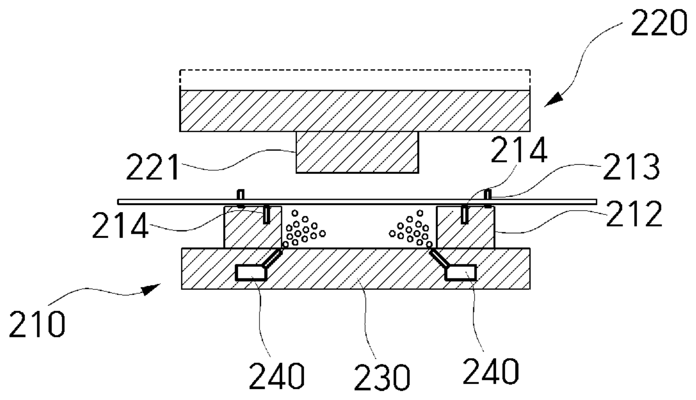
FIG. 11C illustrates the lower press mold including a steam module, in accordance with one or more embodiments.

Meanwhile, the steam module 240 may spray the steam with a preset capacity to the edge of the debossed portion 211 of the lower press mold 210 when the embossed portion 221 of the upper press mold 220 and the debossed portion 211 of the lower press mold 210 press each other. That is, as illustrated in FIG. 11C, the steam module 240 sprays the steam to the real wood sheet 100 when the upper press mold 220 moves downward to press the lower press mold 210. As another method, a method of spraying steam at the moment when the upper press mold 220 and the lower press mold 210 compress the real wood may be used.

Meanwhile, the steam module 240 according to the present embodiment may heat moisture to a predetermined temperature or higher and then spray heated steam. The steam module 240 may use aqueous stain which is aqueous paint.

Figure 11D:
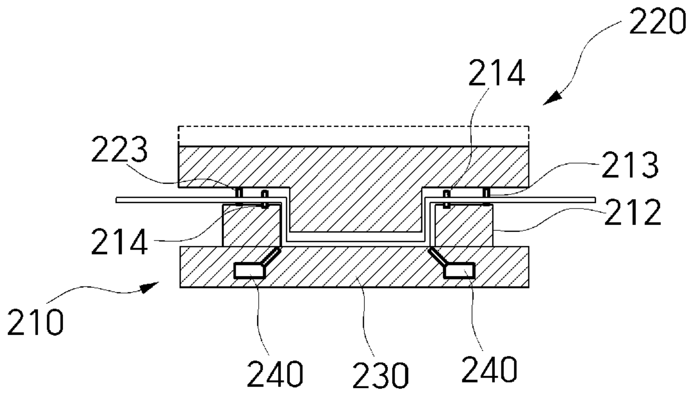
FIG. 11D illustrates the lower press mold including a steam module, in accordance with one or more embodiments.
Figure 12:
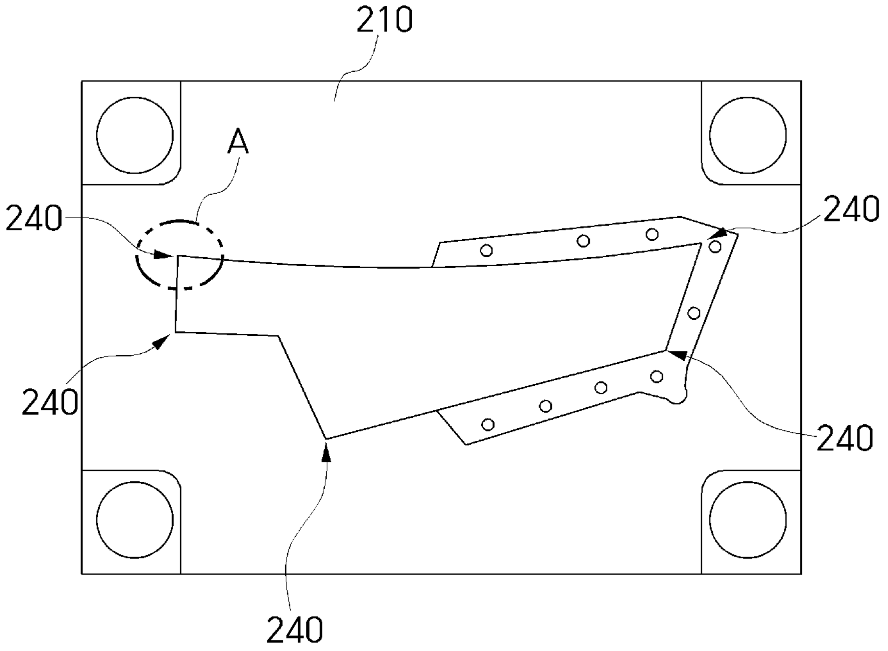
FIG. 12 illustrates a position at which the steam module is provided, in accordance with one or more embodiments.

Thereafter, as illustrated in FIG. 11D, the preforming on the real wood sheet 100 is completed as the upper press mold 220 and the lower press mold 210 press each other.

According to the fourth embodiment, it is possible to prevent the real wood sheet from being damaged by the press which is pressed during the process of compressing the real wood sheet 100 or the preforming process.

Meanwhile, in the fourth embodiment, the steam module may first perform the process of heating the real wood sheet by spraying heated steam to the real wood sheet before the upper press mold and the lower press mold press each other.

According to the fourth embodiment, it is possible to reduce damage to the real wood sheet caused by the preforming process while performing the preforming process on the real wood sheet.

Figure 14:
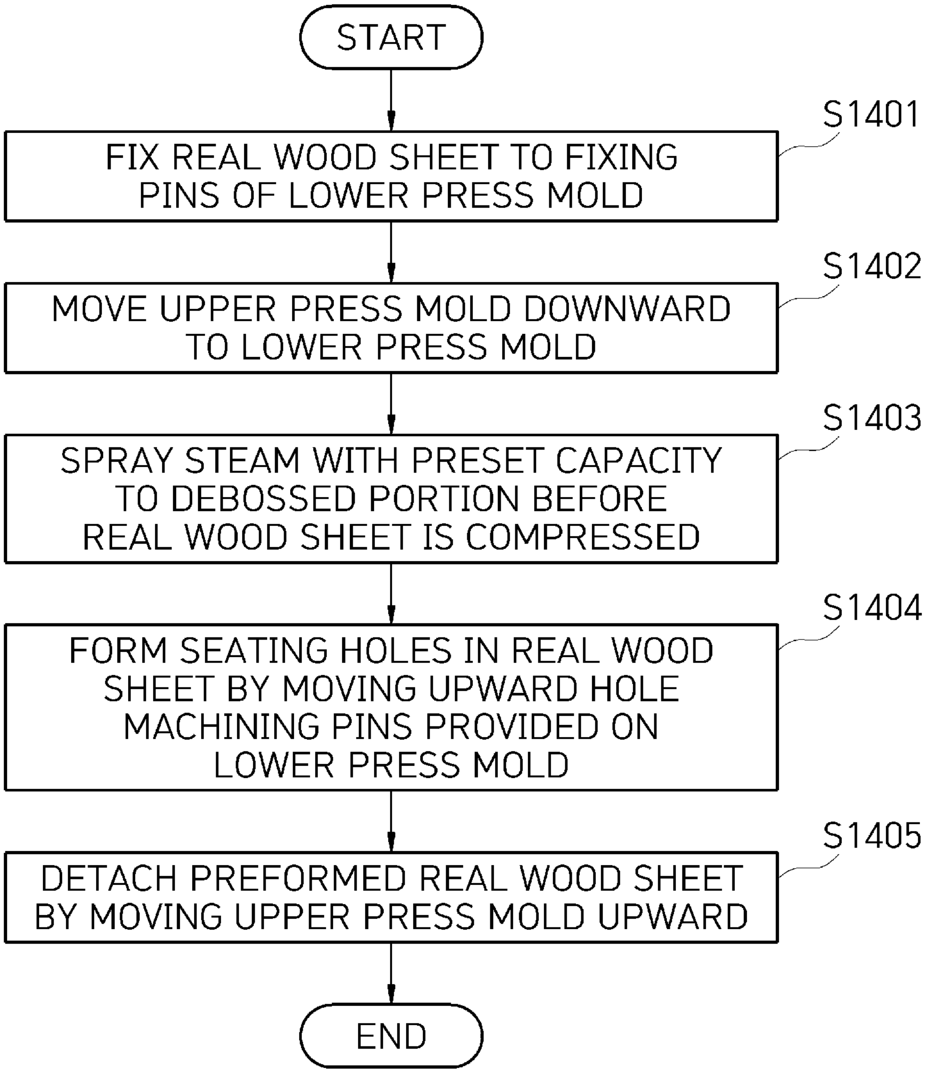
FIG. 14 is a flowchart illustrating a wood preforming method of manufacturing a crash pad for a vehicle including a real wood sheet, in accordance with one or more embodiments.

Hereinafter, a wood preforming method of manufacturing a crash pad for a vehicle including a real wood sheet according to the fourth embodiment will be described with reference to FIG. 14.

First, the real wood sheet 100 is fixed to the fixing pins 213 of the lower press mold 210 (operation S1401).

Next, the upper press mold 220 moves downward toward the lower press mold 210 (operation S1402). In this case, the movable core 230 may be provided on the debossed portion 211 of the lower press mold 210 and may guide the real wood sheet 100 while moving upward from the debossed portion 211 and then moving downward when the upper press mold 220 moves downward.

In this case, the steam module 240 sprays steam with a preset capacity to the debossed portion of the lower press mold 210 before the upper press mold 220 and the lower press mold 210 are used to compress the real wood sheet 100 (S1403). That is, the steam module supplies moisture to the real wood sheet by spraying steam to corner portions before the upper press mold 220 and the lower press mold 210 completely press each other, thereby applying a pressure for forming. In this case, the moisture may be heated to a predetermined temperature or higher and then sprayed by the steam module 240. Aqueous stain, which is aqueous paint, may be used.

Thereafter, the hole machining pins provided on the lower press mold move upward and form the holes in the real wood sheet, i.e., form seating hole s used when the press molds press each other (operation S1404).

Next, the preformed real wood sheet is detached by moving the upper press mold 220 upward (operation S1405).

Each step included in the method described above may be implemented as a software module, a hardware module, or a combination thereof, which is executed by a computing device.

Also, an element for performing each step may be respectively implemented as first to two operational logics of a processor.

The devices, apparatuses, units, modules, and components described herein with respect to FIGS. 1-14 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods that perform the operations described in this application, and illustrated in FIGS. 1-14, are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller, e.g., as respective operations of processor implemented methods. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that be performed by the hardware components and the methods as described above. In one example, the instructions or software include machine code that is directly executed by the one or more processors or computers, such as machine code produced by a compiler. In another example, the instructions or software include higher-level code that is executed by the one or more processors or computers using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), EEPROM, RAM, DRAM, SRAM, flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors and computers so that the one or more processors and computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent to one of ordinary skill in the art, after an understanding of the disclosure of this application, that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A wood preforming device comprising:

an upper press mold comprising an embossed portion;

a lower press mold comprising:

a debossed portion disposed on a portion of the lower press mold on which a preformed real wood sheet is to be formed, the debossed portion corresponding to the embossed portion of the upper press mold; and a support portion configured to support the upper press mold when the lower press mold and the upper press mold press each other, the support portion including one or more fixing pins to insert into and position a real wood sheet on the lower press mold;

a movable core disposed on the debossed portion of the lower press mold, the movable core configured to guide the real wood sheet by moving in an upward direction from the debossed portion when the upper press mold moves in a downward direction; and a steam module configured to spray steam with a preset capacity to an edge portion of the debossed portion of the lower press mold when the upper press mold is moved in a downward direction to the lower press mold, wherein the steam module is disposed in the lower mold.

2. The wood preforming device of claim 1, wherein the steam module is further configured to operate when the embossed portion of the upper press mold and the debossed portion of the lower press mold press each other.

3. The wood preforming device of claim 1, wherein the steam sprayed by the steam module comprises at least one of a moisture and an aqueous stain.

4. The wood preforming device of claim 1, wherein the steam module is further configured to spray the steam to the real wood sheet mold for a preset heating time when the real wood sheet is seated on the lower press before the embossed portion of the upper press mold and the debossed portion of the lower press mold press each other.

5. The wood preforming device of claim 1, wherein the lower press mold further comprises a hole machining pin to form a seating hole in the real wood sheet.

6. The wood preforming device of claim 5, wherein during a press compression molding to form the preformed wood sheet between the upper press and the lower press, the hole machining pin is moved in an upward direction to form the seating hole in the real wood sheet.

7. The wood preforming device of claim 1, wherein the preformed real wood sheet is detached by moving the upper press mold in the upward direction.

8. The wood preforming device of claim 3, wherein the aqueous stain comprises an aqueous paint.

9. A wood preforming device comprising:

an upper press mold comprising an embossed portion;

a lower press mold comprising:

a debossed portion disposed on a portion of the lower press mold on which a preformed real wood sheet is to be formed, the debossed portion corresponding to the embossed portion of the upper press mold; and a support portion configured to support the upper press mold when the lower press mold and the upper press mold press each other, the support portion including one or more fixing pins to insert into and position a real wood sheet on the lower press mold;

a movable core disposed on the debossed portion of the lower press mold, the movable core configured to guide the real wood sheet by moving in an upward direction from the debossed portion when the upper press mold moves in a downward direction; and a steam module configured to spray steam with a preset capacity to an edge portion of the debossed portion of the lower press mold when the upper press mold is moved in a downward direction to the lower press mold, wherein the support portion further includes one or more retractable pins.

10. The wood preforming device of claim 9, wherein the steam module is further configured to operate when the embossed portion of the upper press mold and the debossed portion of the lower press mold press each other.

11. The wood preforming device of claim 9, wherein the steam sprayed by the steam module comprises at least one of a moisture and an aqueous stain.

12. The wood preforming device of claim 9, wherein the steam module is further configured to spray the steam to the real wood sheet mold for a preset heating time when the real wood sheet is seated on the lower press before the embossed portion of the upper press mold and the debossed portion of the lower press mold press each other.

13. The wood preforming device of claim 9, wherein the lower press mold further comprises a hole machining pin to form a seating hole in the real wood sheet.

14. The wood preforming device of claim 13, wherein during a press compression molding to form the preformed wood sheet between the upper press and the lower press, the hole machining pin is moved in an upward direction to form the seating hole in the real wood sheet.

15. The wood preforming device of claim 9, wherein the preformed real wood sheet is detached by moving the upper press mold in the upward direction.

16. The wood preforming device of claim 11, wherein the aqueous stain comprises an aqueous paint.

* * * * *